US007868735B2

(12) United States Patent
Nakashima et al.

(10) Patent No.: US 7,868,735 B2
(45) Date of Patent: Jan. 11, 2011

(54) VEHICLE DOOR CONTROL SYSTEM

(75) Inventors: Kazuhiro Nakashima, Obu (JP); Ifushi Shimonomoto, Okazaki (JP)

(73) Assignee: Denso Corporation, Kariya-city (JP)

( * ) Notice: Subject to any disclaimer, the term of this patent is extended or adjusted under 35 U.S.C. 154(b) by 1068 days.

(21) Appl. No.: 11/340,592

(22) Filed: Jan. 27, 2006

(65) Prior Publication Data

US 2006/0214769 A1  Sep. 28, 2006

(30) Foreign Application Priority Data

Mar. 25, 2005  (JP) ............... 2005-089316

(51) Int. Cl.
B60R 25/00 (2006.01)
B60R 25/10 (2006.01)

(52) U.S. Cl. ................. 340/5.72; 340/426.28

(58) Field of Classification Search ........... 340/426, 340/147, 539, 5.72
See application file for complete search history.

(56) References Cited

U.S. PATENT DOCUMENTS

| 4,205,325 | A | * | 5/1980 | Haygood et al. ....... 340/870.11 |
| 4,730,120 | A | * | 3/1988 | Okada ..................... 307/10.2 |
| 5,155,937 | A | * | 10/1992 | Yamagishi et al. ............ 49/280 |
| 5,574,315 | A | * | 11/1996 | Weber ..................... 307/10.1 |
| 6,194,997 | B1 | * | 2/2001 | Buchner et al. ........ 340/426.26 |
| 7,246,676 | B2 | * | 7/2007 | Cantu .......................... 180/268 |
| 2001/0005084 | A1 | * | 6/2001 | Ponziani ...................... 296/56 |
| 2002/0036259 | A1 | * | 3/2002 | Agam et al. ................ 250/221 |
| 2003/0007851 | A1 | * | 1/2003 | Heigl et al. ................ 414/454 |
| 2003/0189481 | A1 | * | 10/2003 | Hamid ....................... 340/5.53 |
| 2003/0222758 | A1 | * | 12/2003 | Willats et al. .............. 340/5.72 |

FOREIGN PATENT DOCUMENTS

| JP | 57-130689 | 8/1982 |
| JP | 2000-104429 | 4/2000 |
| JP | 2004-218295 | 8/2004 |

OTHER PUBLICATIONS

Office Action issued Apr. 24, 2009 in corresponding Chinese Application No. 200610071645X with an at least partial English-language translation thereof.
Office Action (pp. 1-4) dated Aug. 4, 2010 issued in corresponding Chinese Application No. 200610071645.X with an at least partial English-language translation thereof.
Office Action dated Dec. 3, 2009 issued in corresponding Japanese Application No. 2005-089316 with an at least partial English language translation thereof.

* cited by examiner

*Primary Examiner*—Benjamin C Lee
*Assistant Examiner*—Cal Eustaquio
(74) *Attorney, Agent, or Firm*—Nixon & Vanderhye P.C.

(57) ABSTRACT

In a vehicle door control system, a vehicle-side unit communicates with a hand-held device and detects an operation on any one of vehicle doors. When a condition for unlocking the doors is satisfied, the vehicle-side unit unlocks the doors. In addition, the vehicle-side unit also automatically opens some specific doors having an automatic door opening/closing function. Thus, the holder of the hand-held device no longer needs to issue another command to execute an operation to automatically open the specific doors. The vehicle side-unit also detects an operation on any doors and communicates with the hand-held device to automatically close and lock the doors, when the holder of the hand-held device leaves the vehicle.

3 Claims, 9 Drawing Sheets

VEHICLE DOOR CONTROL SYSTEM

CROSS REFERENCE TO RELATED APPLICATION

This application is based on and incorporates herein by reference Japanese Patent Application No. 2005-89316 filed on Mar. 25, 2005.

FIELD OF THE INVENTION

The present invention relates to a vehicle door control system for controlling each vehicle door by duplex communications between a hand-held device and a vehicle-side unit.

BACKGROUND OF THE INVENTION

A conventional vehicle door control system controls locked and unlocked states of every door of a vehicle in accordance with a result of collating identification (ID) codes through duplex communications between a hand-held electronic key serving as a hand-held device and a vehicle-side electronic unit. In this vehicle door control system, a predetermined communication area surrounding the vehicle is set and, in this communication area, a transmitter employed in the vehicle-side unit transmits a request signal typically at predetermined intervals. Thus, the conventional vehicle door control system monitors movements of the holder of the hand-held device as movements approaching the vehicle, getting on the vehicle and getting off from the vehicle.

When the holder of the hand-held device approaches the vehicle in order to get on the vehicle, for example, the holder of the hand-held device enters the predetermined communication area. At that time, the hand-held device transmits a response signal including an ID code to the vehicle-side unit in response to the request signal. The vehicle-side unit determines whether or not the ID code satisfies a predetermined relational condition typically by examining whether or not the ID code matches an ID code registered in advance in the vehicle-side unit. When the ID code satisfies the relational condition, a control signal is supplied to a door locking control device employed in the vehicle-side unit to put every door in an unlock standby state. With every door put in the unlock standby state and a hand of the holder of the hand-held device touching a door handle of any specific door, a touch sensor employed in the door locking control device detects the touch and the door locking control device unlocks the specific door to allow the holder of the hand-held device to enter the vehicle compartment.

In addition, when the holder of the hand-held device gets off from the vehicle through a door of the vehicle after turning off an engine, a detection area of the hand-held device moves from the compartment of the vehicle to the outside thereof. At that time, when a door locking switch provided at a location in close proximity to the door handle of the door is operated, the door is locked.

In accordance with the above conventional vehicle door control system, the holder of the hand-held device is capable of locking and unlocking every door of the vehicle without manually operating a hand-held device and, thus, enjoying enhanced user friendliness of the vehicle door control system.

In recent years, the number of vehicles having an automatic door opening/closing apparatus has been increasing. The automatic door opening/closing apparatus automatically opens and closes a slide door or a rear door by using typically an electric motor as a motive power source. Such a vehicle may also have a vehicle door control system described above.

In this case, the vehicle door control system and the automatic door opening/closing apparatus operate independently of each other.

That is, the automatic door opening/closing apparatus normally operates when an opening/closing switch is operated or automatically opens a door of the vehicle when the door is opened manually to a predetermined level of opening or a level higher than the predetermined level after the door is put in an unlocked state. On the other hand, the vehicle door control system operates to lock or unlock a door through duplex communications between the hand-held device and the vehicle-side unit as described above. In this way, the vehicle door control system and the automatic door opening/closing apparatus operate independently of each other although both the vehicle door control system and the automatic door opening/closing apparatus control the same vehicle door.

SUMMARY OF THE INVENTION

It is thus an object of the present invention addressing the above drawback to provide a vehicle door control system for controlling a door of a vehicle on the basis of a result of duplex communications between a hand-held device and vehicle-side unit, which are employed in the system, for a case in which the system is provided with an automatic door opening/closing apparatus for some of doors of the vehicle.

According to one aspect, a vehicle door control system comprises a vehicle-side unit and a hand-held device for controlling vehicle doors in accordance with a result of collation of an ID code of the hand-held device with an ID code registered in the vehicle-side unit. The vehicle-side unit includes a lock-state control section, an automatic door opening/closing section and an operation detection section. When the operation detection section detects a predetermined operation of a holder of the hand-held device on any vehicle doors, the lock-state control section unlocks at least one vehicle door from a locked state and the automatic door opening/closing section automatically opens the vehicle door from a closed state.

According to another aspect, when the operation detection section detects a predetermined operation, the automatic door opening/closing section automatically close at least one vehicle door from a closed state and the lock-state control section locks the vehicle door.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENTS

The present invention will be described in detail with reference to various embodiments.

First Embodiment

Figure 1:
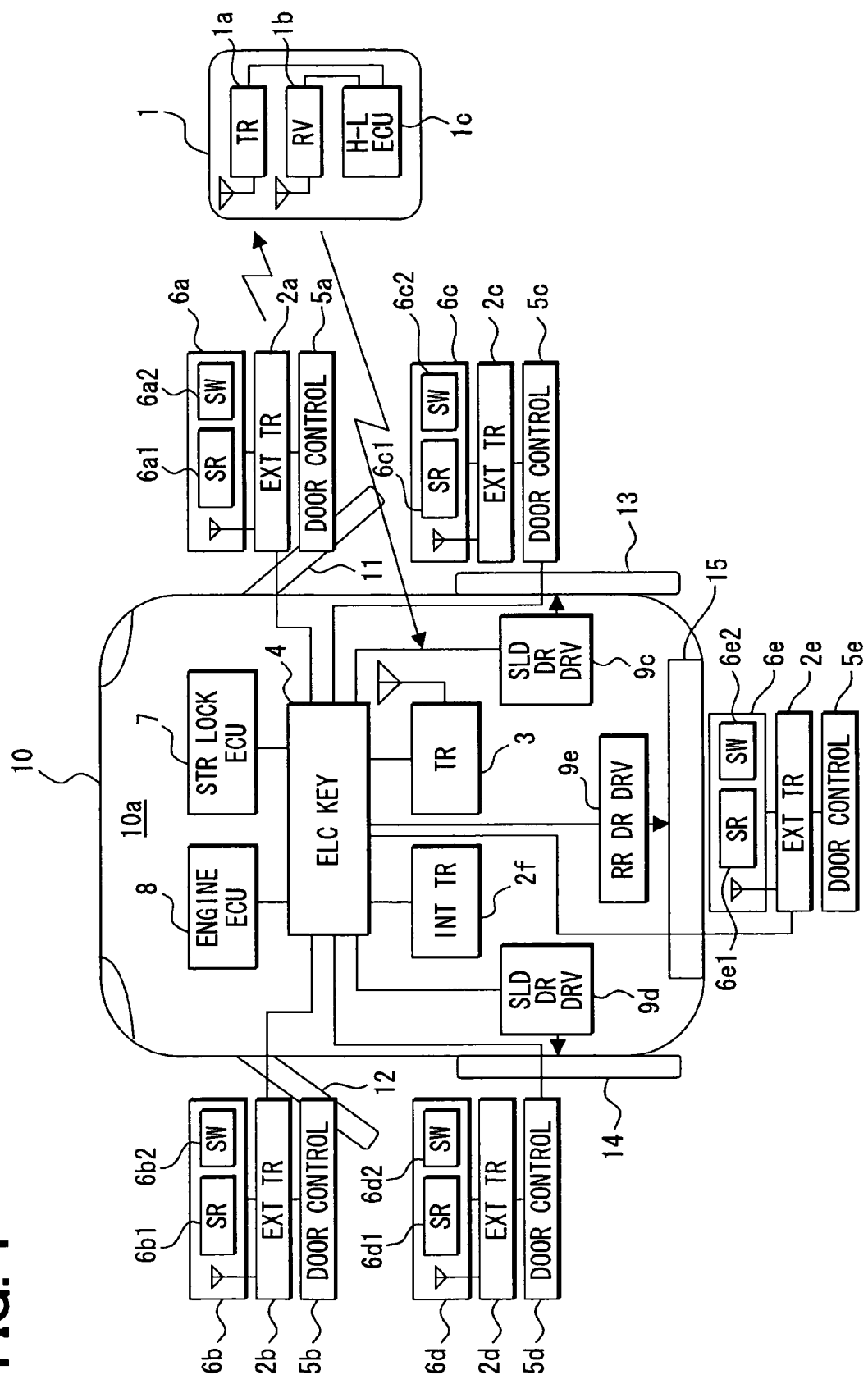
FIG. 1 is a block diagram showing a vehicle door control system according to a first embodiment.

Referring to FIG. 1, a vehicle door control system is provided for a vehicle 10 and includes hand-held device (electronic key) 1 and a vehicle-side unit 10a. The vehicle-side unit 10a employs an electronic control unit (ECU) 4 for a key to control locked and unlocked states of every vehicle door 11 to 15, which are provided at each entrance into a vehicle compartment, on the basis of a result of collation of an ID code through duplex communications with the hand-held device 1. In addition, in order to enhance security of the vehicle 10, the electronic key ECU 4 also controls a steering lock state and a state of permitting or inhibiting the starting of an engine employed in the vehicle 10.

As shown in FIG. 1, the hand-held device 1 has a receiver 1a for receiving request signals from compartment external transmitters 2a to 2e employed in the vehicle-side unit 10a as well as a request signal from a compartment internal transmitter 2f also employed in the vehicle-side unit 10a. The hand-held device 1 also has a transmitter 1b for transmitting a response signal including an identification (ID) code in response to a received request signal. In addition, the hand-held device 1 has a hand-held device ECU 1c connected to the receiver 1a and the transmitter 1b as an ECU for executing various kinds of control processing. More specifically, the hand-held device ECU 1c checks a signal received by the receiver 1a in order to determine whether or not the received signal is a request signal. When the received signal is a request signal, the hand-held device ECU 1c generates a response signal and drives the transmitter 1b to transmit the response signal to the vehicle-side unit 10a.

The compartment external transmitters 2a to 2e are provided on the respective vehicle doors 11 to 15 of the vehicle 10. The vehicle-side unit 10a employs the compartment internal transmitter 2f in addition to the compartment external transmitters 2a to 2e. The compartment external transmitters 2a to 2e and the compartment internal transmitter 2f each transmit a request signal in accordance with a transmission command signal received from the electronic key ECU 4, which serves as the principal component of the vehicle-side unit 10a.

It is to be noted that the vehicle doors 11 and 12 are hinge-type doors provided for the front seats of the vehicle 10. On the other hand, the vehicle doors 13 and 14 are slide-type doors provided for the rear seats of the vehicle 10. The slide-type vehicle door 13 has a slide-door driving section 9c including a motor serving as a driving-power source. Similarly, the slide-type vehicle door 14 has a slide-door driving section 9d including a motor serving as a driving-power source. The vehicle doors 13 and 14 of the slide type can be automatically opened and closed by the slide-door driving sections 9c and 9d respectively in accordance with an opening/closing signal generated by the electronic key ECU 4. The rear vehicle door 15 also has a rear-door driving section 9e including a motor serving as a driving-power source as the slide-door driving sections 9c and 9d do. In the same way, the rear vehicle door 15 can be automatically opened and closed by the rear-door driving section 9e in accordance with an opening/closing signal generated by the electronic key ECU 4. In many cases, the slide-type vehicle doors 13 and 14 as well as the rear door 15 are each a relatively heavy door. Thus, by providing the slide-type vehicle doors 13 and 14 as well as the rear door 15 with the respective slide-door driving sections 9c and 9d as well as the rear-door driving section 9e, which have functions to automatically close and open the slide-type vehicle doors 13 and 14 as well as the rear door 15 respectively, it is possible to reduce loads, which are to be borne by passengers when the passengers get on or get off the vehicle 10.

The distance that request signals transmitted by the compartment external transmitters 2a to 2e can reach is typically set at a value in the range 0.7 to 1.0 meters. Thus, when the vehicle 10 is put in a state of being parked, a detection area determined by this distance range is formed, surrounding each of the vehicle doors 11 to 15. As a result, one of the compartment external transmitters 2a to 2e will detect a movement made by the holder of the hand-held device 1 to approach the vehicle 10. On the other hand, a detection area of the compartment internal transmitter 2f is set to cover an area in the compartment of the vehicle 10 so as to make the compartment internal transmitter 2f capable of determining whether the hand-held device 1 is placed at a location inside or outside the compartment of the vehicle 10.

In addition, the vehicle-side unit 10a also includes a receiver 3 installed in the compartment of the vehicle 10 and put in a state of being capable of receiving a response signal from the hand-held device 1 in response to an operation carried out by the transmitters 2a to 2f to output a transmitted request signal. As a matter of fact, the receiver 3 is provided as a receiver dedicated to receive such a response signal. A response signal received by the receiver 3 is passed on to the electronic key ECU 4. On the basis of an ID code included in the response signal, the electronic key ECU 4 determines whether or not to execute control including control of a door lock/unlock state of each of the vehicle doors 11 to 15.

The vehicle-side unit 10a also includes door locking control sections 5a to 5e respectively on the vehicle doors 11 to 15 of the vehicle 10. The door locking control sections 5a to 5e are sections for locking or unlocking their respective vehicle doors 11 to 15. The door locking control sections 5a to 5e also change a locked state of the respective vehicle doors 11 to 15 to an unlock standby state allowing the vehicle doors 11 to 15 to be unlocked when the holder of the hand-held device 1 touches the door outside handle (door handle) 6 of any one of the respective vehicle doors 11 to 15. The door locking control sections 5a to 5e each operate in accordance with a command signal received from the electronic key ECU 4.

On the door handles 6a to 6e, which are provided for the vehicle doors 11 to 15 respectively, touch sensors 6a1 to 6e1 are installed, respectively. The touch sensors 6a1 to 6e1 are capable of detecting touching one of the door handles 6a to 6e by the holder, respectively. In addition, on the door handles 6a to 6e, door locking switches 6a2 to 6e2 are provided, respectively. The door locking switches 6a2 to 6e2 are each a push switch. When any one of the door locking switches 6a2 to 6e2 is operated, the corresponding one of the vehicle doors 11 to 15 is locked. The door handles 6a to 6e are constructed to also operate as antennas of the compartment external transmitters 6a to 6e, respectively.

In order to enhance the security of the vehicle 10, the vehicle door control system of this embodiment is also provided with a steering lock ECU 7 and an engine ECU 8. In accordance with a command signal received from the electronic key ECU 4, the steering lock ECU 7 sets or terminates a steering lock state whereas the engine ECU 8 executes control to allow or inhibit an operation to start of the engine employed in the vehicle 10. Processing carried out by the steering lock ECU 7 and the engine ECU 8 is briefly explained below.

In operation, when the holder of the hand-held device 1 opens one of the vehicle doors 11 to 15 to get on the vehicle 10 and operates an engine switch provided in the vehicle 10, the electronic key ECU 4 carries out duplex communications with the hand-held device 1 by using the compartment internal transmitter 2f provided in the compartment of the vehicle 10 and the receiver 3 in order to collate an ID code. In conjunction with the electronic key ECU 4, on the other hand, the steering lock ECU 7 makes sure that the steering lock state can be terminated. More specifically, when the result of the ID-code collation is an OK indicating a code match, the electronic key ECU 4 notifies the steering lock ECU 7 that the steering lock state can be terminated. In accordance with the notice received from the electronic key ECU 4, the steering lock ECU 7 terminates the steering lock state. In addition, the electronic key ECU 4 also informs, by outputting a command signal, the engine ECU 8 that the inhibition of the operation to start the engine has been terminated.

Figure 2:
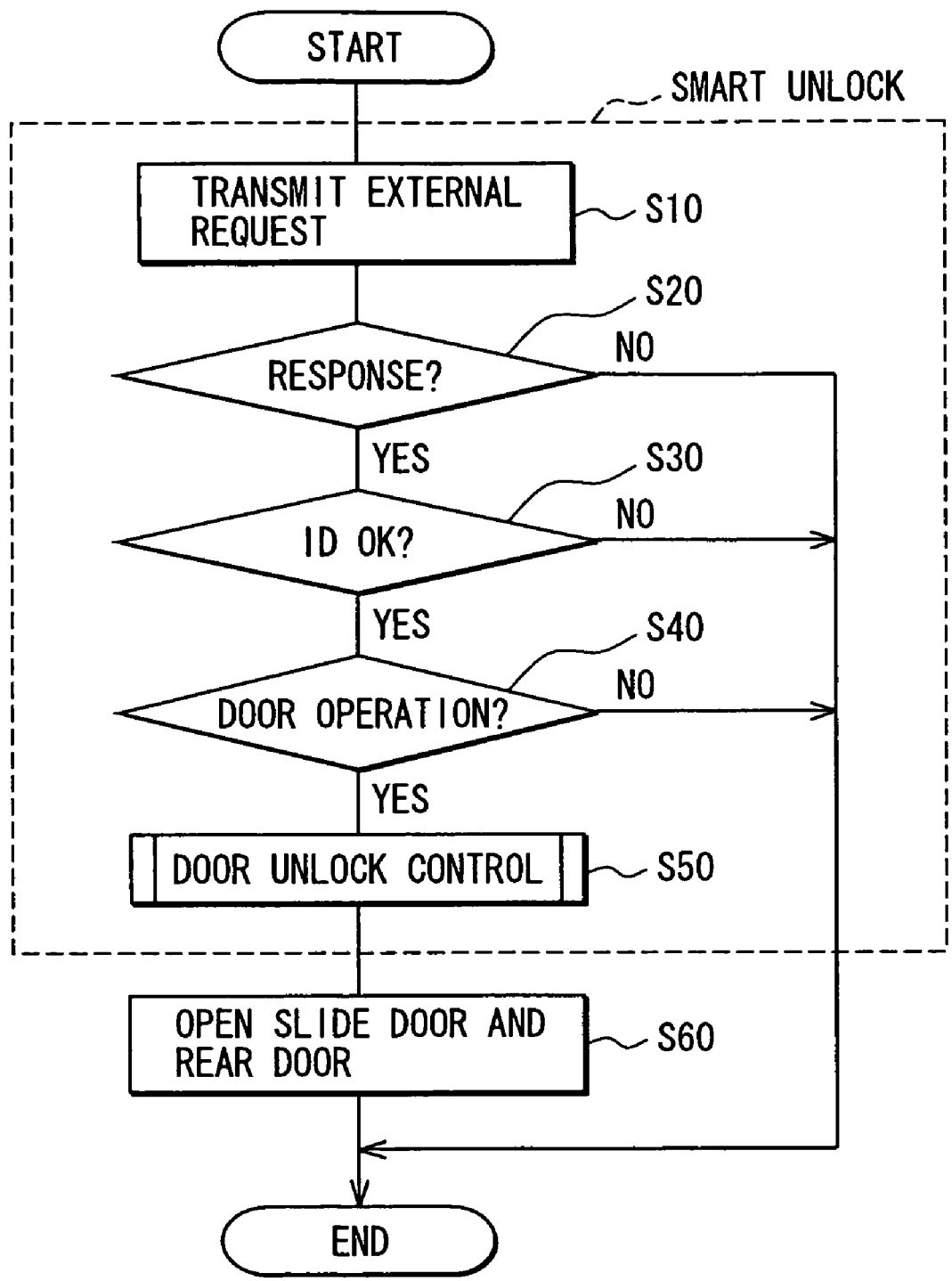
FIG. 2 is a flowchart representing processing carried out by an electronic key ECU of a vehicle-side unit to execute door unlocking control to unlock vehicle doors on the basis of a result of ID code collation through duplex communications between the vehicle-side unit and a hand-held device in the first embodiment.
Figure 3:
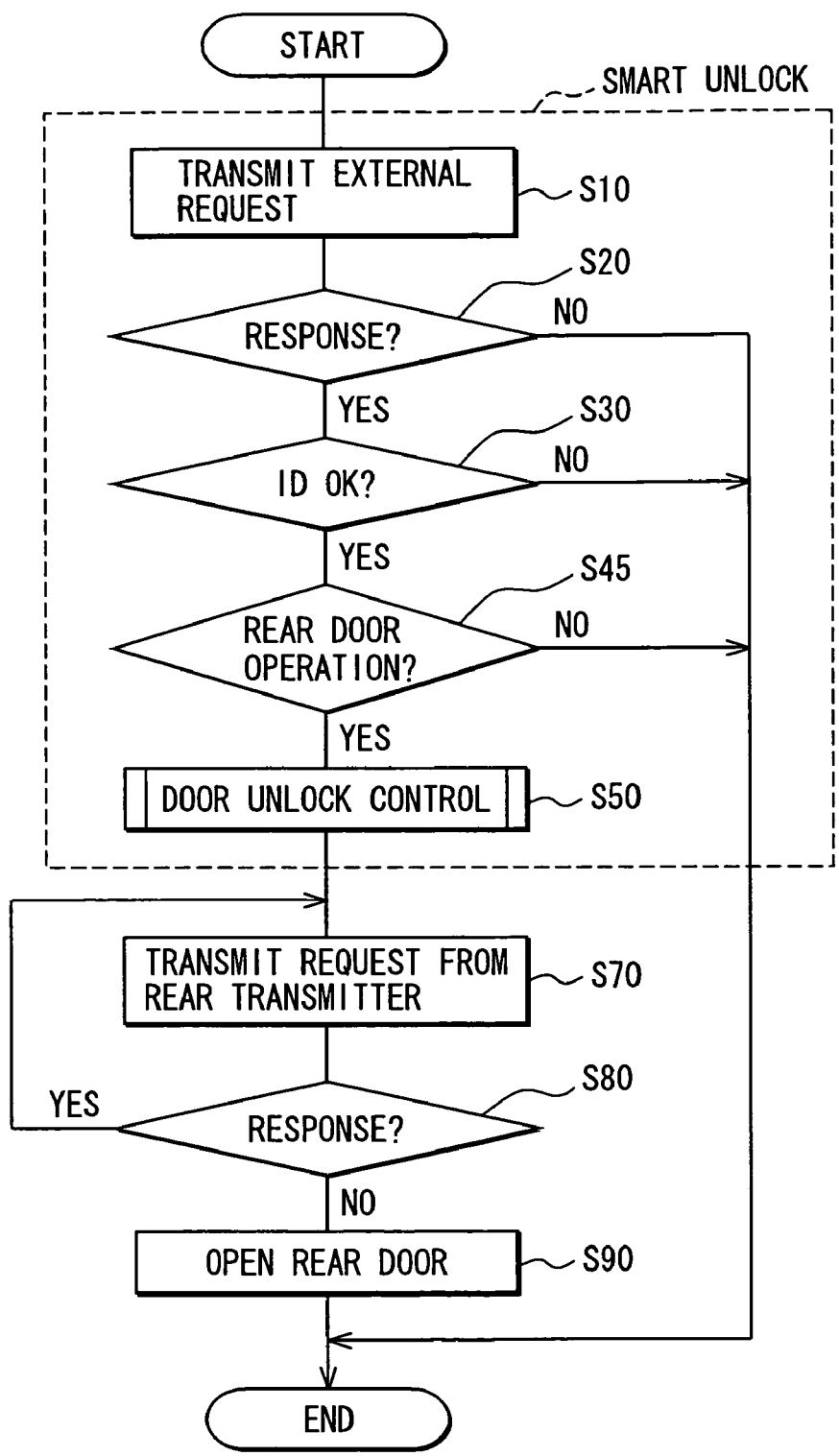
FIG. 3 is a flowchart representing processing carried out by an electronic key ECU of a vehicle-side unit to execute door unlocking control to unlock vehicle doors on the basis of a result of ID code collation through duplex communications between the vehicle-side unit and a hand-held device in a vehicle door control system according to a second embodiment.

By referring to a flowchart shown in FIG. 2, the details of processing carried out by the electronic key ECU 4 is described. This processing is, among other kinds of processing, to execute control of door unlocking operations to unlock the vehicle doors 11 to 15 on the basis of a result of collating an ID code by duplex communications between the vehicle-side unit 10a and the hand-held device 1. It is to be noted that this processing is carried out at predetermined intervals. That is, while the vehicle 10 is being parked with the engine stopped and the vehicle doors 11 to 15 locked, the electronic key ECU 4 requests each of the compartment external transmitters 2a to 2e to transmit a request signal after the elapse of a predetermined period of time in order to determine whether or not the holder of the hand-held device 1 has approached the vehicle 10.

First of all, at step S10, the electronic key ECU 4 issues a command to each of the compartment external transmitters 2a to 2e as a command requesting each of the compartment external transmitters 2a to 2e to transmit a request signal. Then, at next step S20, the electronic key ECU 4 produces a result of determination as to whether or not a response signal has been received from the hand-held device 1 as a response to any one of the transmitted request signals. When no response signal has been received from the hand-held device 1, it is assumed that the hand-held device 1 does not exist in the detection areas, that is, near the doors 11 to 15. In this case, the execution of this processing is ended. When a response signal has been received from the hand-held device 1, on the other hand, the processing proceeds to step S30.

It is to be noted that the compartment external transmitters 2a to 2e transmit request signals conveying ID codes unique to the compartment external transmitters 2a to 2e respectively. In response to any specific one of the request signals, the hand-held device 1 transmits a response signal conveying the ID code conveyed by the specific request signal. As an alternative, the electronic key ECU 4 gives commands to the compartment external transmitters 2a to 2e sequentially one after another to transmit request signals. In this way, the electronic key ECU 4 is capable of recognizing which of the compartment external transmitters 2a to 2e has its request signal responded by a response signal transmitted by the hand-held device 1. That is, the electronic key ECU 4 is capable of recognizing to which of the vehicle doors 11 to 15 the holder of the hand-held device 1 has approached.

At step S30, the electronic key ECU 4 produces a result of determination as to whether or not the ID code conveyed by the response signal satisfies a predetermined relation with an ID code registered in advance in the vehicle-side unit 10a. For example, the electronic key ECU 4 produces a result of determination as to whether the ID code conveyed by the response signal matches or does not match the ID code registered in advance in the vehicle-side unit 10a. A determination result indicating that the response signal matches the ID code registered in advance in the vehicle-side unit 10a is referred to as an OK result. On the other hand, a determination result indicating that the response signal does not match the ID code registered in advance in the vehicle-side unit 10a is referred to as an NG result. When the result of the determination of the ID code is an OK, the processing proceeds to step S40 at which the electronic key ECU 4 produces a result of determination as to whether or not the holder of the hand-held device 1 has operated one of the door handles 6a to 6e. When the result of the determination at step S30 is an NG, on the other hand, the execution of the processing is ended.

It is to be noted that, when the result of the determination of step S40 is an OK, the electronic key ECU 4 determines the location of the hand-held device 1, which has transmitted the response signal, from the ID code conveyed by the response signal or on the basis of the order in which the request signals have been transmitted by the compartment external transmitters 2a to 2e. Then, the electronic key ECU 4 gives a command signal to one selected from the door locking control sections 5a to 5e as a particular door locking control section corresponding to the location of the hand-held device 1 in order to request the particular door locking control section 5a, 5b, 5c, 5d or 5e to change the state of a specific vehicle door 11, 12, 13, 14 or 15 associated with the particular door locking control section 5a, 5b, 5c, 5d or 5e respectively from a locked state to an unlock standby state. In accordance with the command signal, the particular door locking control section 5a, 5b, 5c, 5d or 5e changes the specific vehicle door 11, 12, 13, 14 or 15 respectively from a locked state to an unlock standby state.

When the particular door locking control section 5a, 5b, 5c, 5d or 5e changes the specific vehicle door 11, 12, 13, 14 or 15 respectively from a locked state to an unlock standby state in accordance with the command signal, and a specific touch sensor 6a1, 6b1, 6c1, 6d1 or 6e1 provided on a particular door handle 6a, 6b, 6c, 6d or 6e respectively detects an operation carried out by the holder of the hand-held device 1 on the particular door handle 6a, 6b, 6c, 6d or 6e, which is associated with the selected particular door locking control section 5a, 5b, 5c, 5d or 5e respectively, the specific touch sensor 6a1, 6b1, 6c1, 6d1 or 6e1 transmits detection information to the electronic key ECU 4. Receiving the detection information at step S40, the electronic key ECU 4 determines that the holder of the hand-held device 1 has operated the particular door handle 6a, 6b, 6c, 6d or 6e. In this case, the processing proceeds to step S50. When the holder of the hand-held device 1 did not operate any one of the door handles 6a to 6e, on the other hand, the execution of this processing is ended.

At step S50, the electronic key ECU 4 requests the door locking control sections 5a to 5e to unlock all the vehicle doors 11 to 15, respectively. In this way, when the holder of the hand-held device 1 merely touches any specific one of the door handles 6a to 6e, all the vehicle doors 11 to 15 are automatically unlocked. Thus, the processes carried out at steps S10 to S50 are processing to terminate the locked states of the vehicle doors 11 to 15 without the need for the holder of the hand-held device 1 to manually operate the hand-held device 1. This processing to terminate the locked states of the vehicle doors 11 to 15 is referred to as a smart unlocking operation.

It is to be noted that the detector of an operation carried out by the holder of the hand-held device 1 on any one of the vehicle doors 11 to 15 does not have to be the touch sensors 6a1 to 6e1. For example, a detection mechanism can also be employed as a detector for mechanically detecting an operation to pull out any of the door handles 6a to 6e. As another example, an unlock button is provided on each of the door handles 6a to 6e and an operation carried out on an unlock button provided on any specific one of the door handles 6a to 6e is detected as an operation carried out on the specific door handle. As another alternative, only either the touch sensors 6a1 to 6e1 or the door locking switches 6a2 to 6e2 are provided on the vehicle doors 11 to 15 respectively to serve as both a lock operation section as well as an unlock operation section. As a further alternative, all the vehicle doors 11 to 15 can be set in an unlock standby state when the result of the collation of the ID code is an OK.

Then, at next step S60, the electronic key ECU 4 issues open command signals to the slide-door driving sections 9c and 9d as well as the rear-door driving section 9e. In accordance with the open command signals, the slide-door driving sections 9c and 9d as well as the rear-door driving section 9e automatically open the slide-type vehicle doors 13 and 14 as well as the rear door 15, respectively.

As described above, in the vehicle door control system according to the first embodiment, when conditions for unlocking the vehicle doors 11 to 15 are satisfied, the vehicle-side unit 10a unlocks the vehicle doors 11 to 15. At the same time, it automatically opens the slide-type vehicle doors 13 and 14 as well as the rear door 15. The conditions for unlocking the vehicle doors 11 to 15 are satisfied when the result of the collation of an ID code is an OK and an operation carried out by the holder of the hand-held device 1 on one of the vehicle doors 11 to 15, which corresponds to the ID code, is detected. Thus, the holder of the hand-held device 1 no longer needs to further give a command to carry out automatic operations to open the slide-type vehicle doors 13 and 14 as well as the rear door 15 after the vehicle doors 11 to 15 have been unlocked. As a result, the user friendliness provided by the vehicle door control system to the holder of the hand-held device 1 can be further enhanced.

In the first embodiment, when the holder of the hand-held device 1 operates any one of the vehicle doors 11 to 15 including the hinge-type vehicle doors 11 and 12, all the vehicle doors 11 to 15 are unlocked and the slide-type vehicle doors 13 and 14 as well as the rear door 15 each having an automatic door opening/closing function are opened automatically. Thus, other passengers are capable of getting on the vehicle with ease. However, the slide-type vehicle doors 13 and 14 as well as the rear door 15 do not always need to be opened automatically.

For example, it is possible to provide a configuration in which, after all the vehicle doors 11 to 15 are unlocked, only any specific one of the slide-type vehicle doors 13 and 14 as well as the rear door 15 is opened automatically when the holder of the hand-held device 1 operates the specific vehicle door. As an alternative, it is also possible to provide a configuration in which, when the hinge-type vehicle door 11 provided for the right-side front seat is operated, the vehicle door 13 provided for the right-side rear seat is opened automatically. When the holder of the hand-held device 1 knows the feature of the provided configuration of the vehicle door control system in advance, the vehicle door control system will not raise a problem in particular.

In addition, in the first embodiment, the slide-type vehicle doors 13 and 14 as well as the rear door 15 are provided with respectively the slide-door driving sections 9c and 9d as well as the rear-door driving section 9e for carrying out automatic door opening/closing operations. However, a general hinge-type vehicle door may of course have a hinge-door driving section for executing an automatic door opening/closing function.

Second Embodiment

In many cases, the rear door 15 is a door of the type allowing the door to be opened and closed by being rotated in the vertical direction or opened and closed by being rotated in the horizontal direction. In consequence, when the rear door 15 is automatically opened after an operation carried out by the holder of the hand-held device 1 on the rear door 15 is detected, it is likely that the rear door 15 is brought into contact with the holder of the hand-held device 1 or other people accidentally. In order to solve this problem, the vehicle door control system according to the second embodiment allows the rear door 15 to be opened while reliably preventing the rear door 15 from being brought into contact with the holder of the hand-held device 1 accidentally when the holder of the hand-held device 1 carries out an operation on the rear door 15.

Therefore, the second embodiment is different from the first embodiment in that, when the holder of the hand-held device 1 carries out an operation on the rear door 15, the location of the holder of the hand-held device 1 is assumed to be a location in close proximity to the rear door 15. Thus, in order to execute control to open the rear door 15 with a high degree of safety, at step S45, the electronic key ECU 4 determines whether or not an operation carried out by the holder of the hand-held device 1 on the rear door 15 has been detected.

It is to be noted that, in order to put only the rear door 15 with the compartment external transmitter 2e thereof communicating with the hand-held device 1 in an unlock standby state, at step S20, the electronic key ECU 4 of course produces a result of determination as to whether or not a response signal has been received from the hand-held device 1 as a response to a request signal transmitted by the compartment external transmitter 2e provided on the rear door 15.

At step S70 following the processing carried out to implement the smart unlocking operation, the compartment external transmitter 2e is driven to retransmit a request signal. Then, at step S80, the electronic key ECU 4 produces a result of determination as to whether or not a response signal has been received from the hand-held device 1 as a response to the request signal transmitted by the compartment external transmitter 2e. When the result of the determination indicates that a response signal has been received from the hand-held device 1, that is, when the holder of the hand-held device 1 is present in the detection area of the compartment external transmitter 2e, the holder of the hand-held device 1 is assumed to be still at a location in close proximity to the rear door 15. In this case, when the rear door 15 is opened, it is likely that the rear door 15 is brought into contact accidentally with the holder of the hand-held device 1.

Therefore, when the determination result produced at step S80 indicates that a response signal has been received from the hand-held device 1, the processing returns to step S70 to repeat the processes of step S S70 and S80. As a matter of fact, the processes of step S70 and S80 are carried out repeatedly in a state of waiting for the determination result produced at step S80 to no longer indicate that a response signal has been received from the hand-held device 1. As the determination result produced at step S80 indicates that a communication between the compartment external transmitter 2e and the hand-held device 1 cannot be carried out anymore and a response signal is not received from the hand-held device 1 in a predetermined period of time, the processing proceeds to step S90 at which the rear door 15 is opened automatically.

When a communication can not be carried out between the compartment external transmitter 2e, the receiver 3 and the hand-held device 1, the holder of the hand-held device 1 may be assume to present at a location outside the detection area of the compartment external transmitter 2e. Thus, when a communication between the compartment external transmitter 2e and the hand-held device 1 cannot be carried out, it is possible to open the rear door 15 while preventing the rear door 15 from being brought into contact with the holder of the hand-held device 1 accidentally.

It is to be noted that, when the compartment external transmitter 2e provided on the rear door 15 retransmits a request signal, an audio message can be output as a message to prompt the holder of the hand-held device 1 to stay away from the vehicle 10.

Third Embodiment

When a result of determination indicates that the holder of the hand-held device 1 has carried out an operation on any specific one of the vehicle doors 11 to 15, on the basis of the condition of the detected operation carried out by the holder of the hand-held device 1, the electronic key ECU 4 makes a decision of whether or not to automatically open the other vehicle doors, which are not operated by the holder of the hand-held device 1 but each provided with the automatic door opening/closing function. Thus, another vehicle door can be automatically opened if, for example, a passenger is about to get on the vehicle 10 through the other vehicle door. When only the holder of the hand-held device 1 is about to get on the vehicle 10 through the specific vehicle door, on the other hand, the other vehicle doors each provided with the automatic door opening/closing function are not opened. In this way, the degree of freedom to utilize the vehicle 10 can be enhanced.

Figure 4:
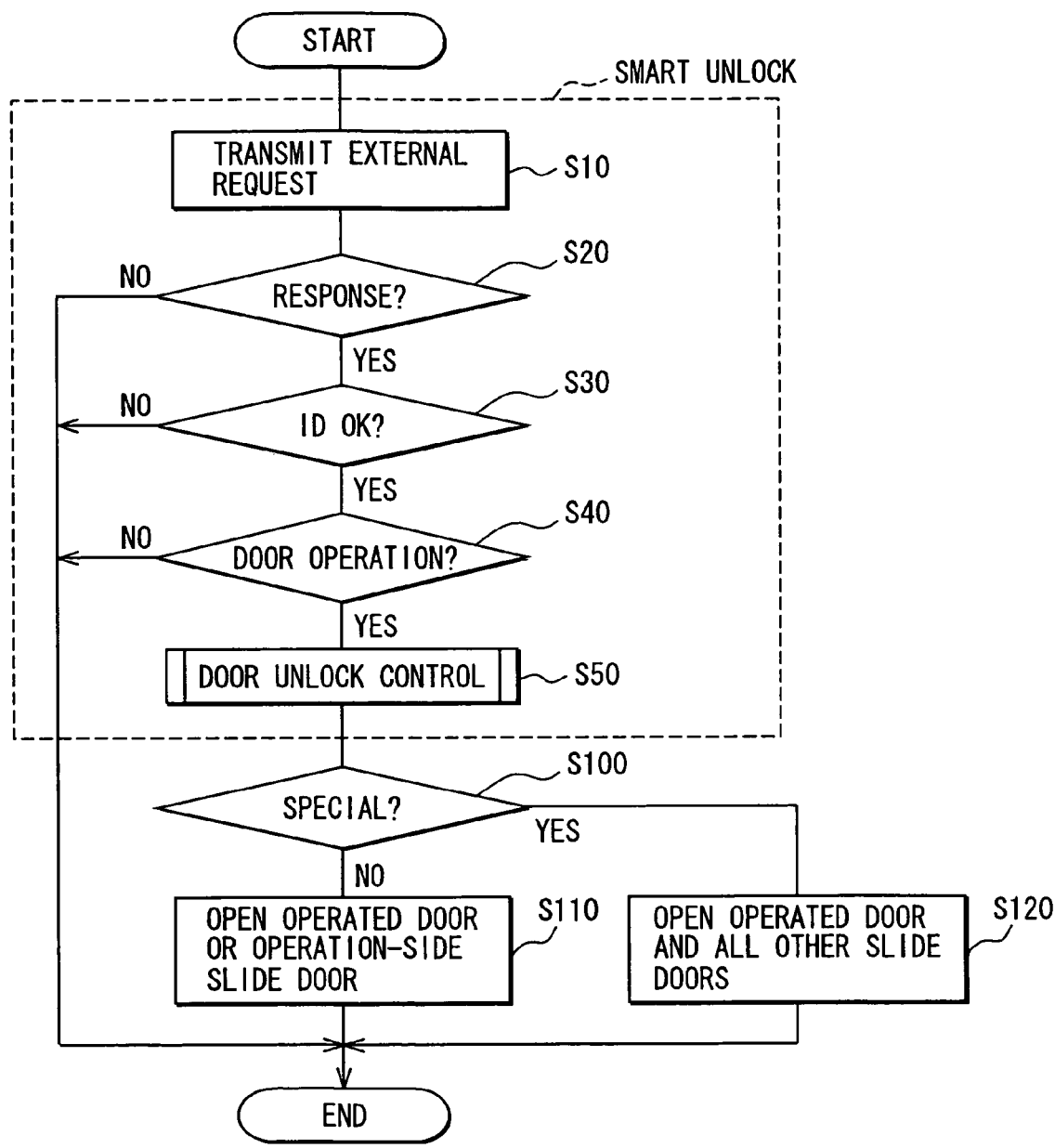
FIG. 4 is a flowchart representing processing carried out by an electronic key ECU of a vehicle-side unit to execute door unlocking control to unlock vehicle doors on the basis of a result of ID code collation through duplex communications between the vehicle-side unit and a hand-held device in a vehicle door control system according to a third embodiment.
Figure 5:
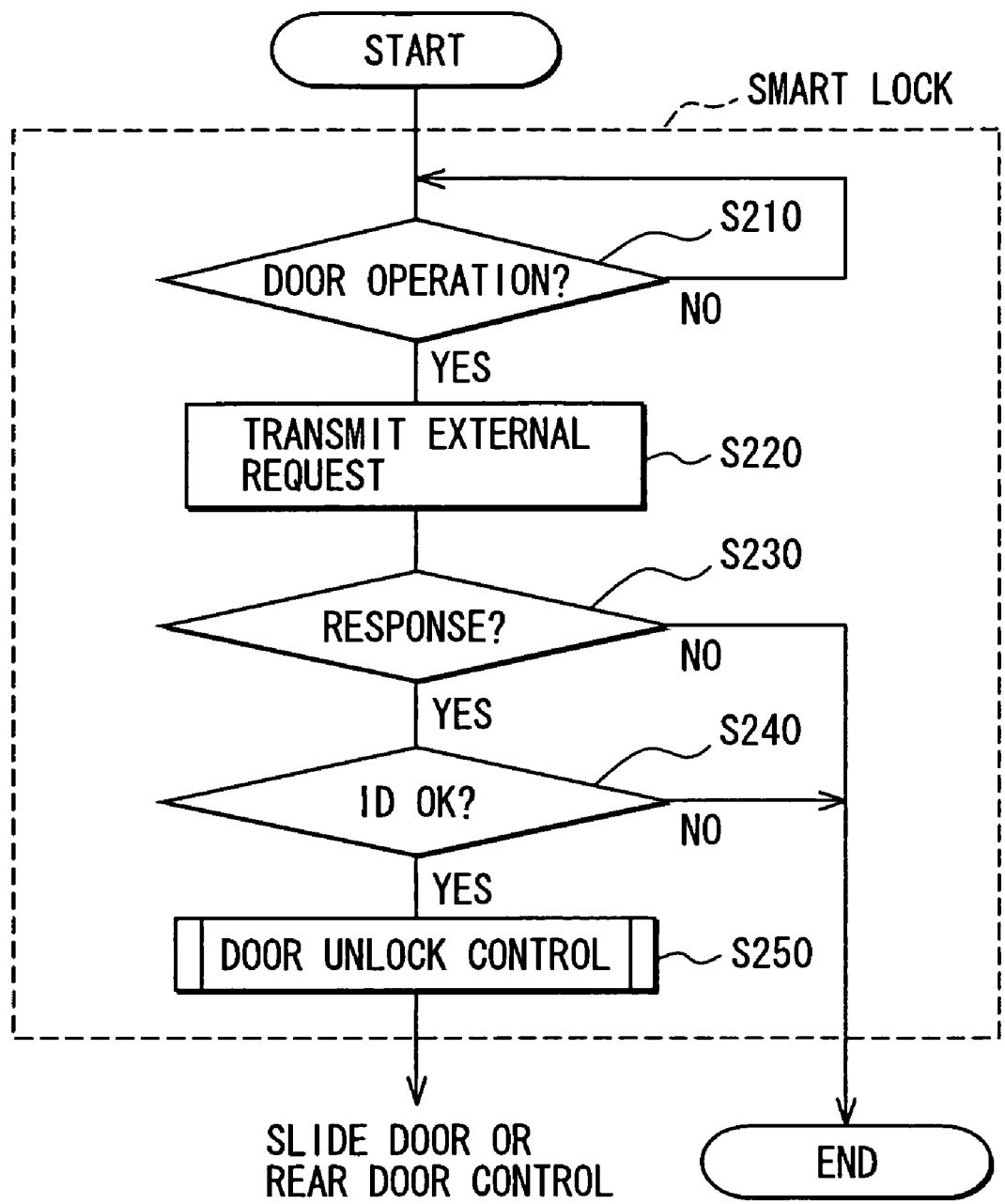
FIG. 5 is a flowchart representing processing carried out to execute a smart unlocking operation in accordance with a fourth embodiment.

Processing carried out by the electronic key ECU 4 employed in the third embodiment is explained by referring to a flowchart shown in FIG. 4. At step S100 following the processing carried out to implement the smart unlocking operation, the electronic key ECU 4 produces a result of determination as to whether or not the operation detected at step S40 as an operation carried out by the holder of the hand-held device 1 is a special operation. The result of determination as to whether or not the operation detected at step S40 is a special operation carried out by the holder of the hand-held device 1 is produced on the basis of the duration of the operation or the number of times the operation has been carried out. When an operation (touch), is carried out continuously for at least a predetermined period of time or at least a predetermined number of times, for example, the operation is determined to be a special operation. Otherwise, the operation is determined to be an ordinary operation.

When the determination result produced at step S100 indicates that the operation detected at step S40 as an operation carried out by the holder of the hand-held device 1 is an ordinary operation, only the operated vehicle door is opened. As an alternative, a slide-type vehicle door, which has the automatic door opening/closing function and is provided on the same side as the operated door, is also automatically opened. When the determination result produced at step S100 indicates that the operation detected at step S40 as an operation carried out by the holder of the hand-held device 1 is a special operation, on the other hand, all the vehicle doors 13 to 15 each having the automatic door opening/closing function are automatically opened without regard to which vehicle door has been operated.

As described above, by making a decision of whether or not to automatically open the other vehicle doors, which are not operated by the holder of the hand-held device 1 but each provided with the automatic door opening/closing function, on the basis of the condition of the detected operation carried out by the holder of the hand-held device 1, the holder of the hand-held device 1 is capable of utilizing the vehicle 10 with a higher degree of freedom.

Fourth Embodiment

In the processing carried out to implement the smart unlocking operation in any one of the first to third embodiments, a request signal is transmitted from each of the compartment external transmitters 2a to 2e periodically to detect a movement made by the holder of the hand-held device 1 to approach the vehicle 10. In this fourth embodiment, on the other hand, an operation carried out by the holder of the hand-held device 1 on any of the vehicle doors 11 to 15 is detected and a detected operation is used as a trigger for starting the processing carried out to implement the smart unlocking operation. By doing so, each of the compartment external transmitters 2a to 2e can be requested to transmit a request signal only when it is necessary. As a result, the power consumption of the vehicle-side unit 10a can be reduced.

The processing begins with step S210 to check and produce a result of determination as to whether or not an operation has been carried out by the holder of the hand-held device 1 on any of the vehicle doors 11 to 15. When the determination result produced at step S210 indicates that an operation has been carried out by the holder of the hand-held device 1 on any of the vehicle doors 11 to 15, the processing proceeds to step S220. It is also possible to provide a configuration in which, instead of polling for such an operation carried out by the holder of the hand-held device 1 on any of the vehicle doors 11 to 15 at step S210, the event of such an operation can be used as an interrupt to start processes carried out at steps S220 to S250 described as follows.

An operated one of the door handles 6a to 6e is associated with a specific one of the compartment external transmitters 2a to 2e. At step S220, the specific compartment external transmitter or each of the compartment external transmitters 2a to 2e is requested to transmit a request signal. Then, the processing proceeds to step S230 to produce a result of determination as to whether or not a response signal has been transmitted by the hand-held device 1 in response to this request signal. When the result of the determination indicates that a response signal has been received from the hand-held device 1, the processing proceeds to step S240 to collate an ID conveyed by the response signal with the ID registered in advance in the vehicle-side unit 10a in order produce a result of determination as to whether or not the IDs match each other. When the result of the determination in the collation process is an OK, the processing proceeds to step S250 at which the locked state of all the vehicle doors 11 to 15 is terminated.

It is to be noted that, when the determination result produced at step S230 indicates that a response signal has not been received from the hand-held device 1 or when the determination result produced in the collation process carried out at step S240 is an NG, on the other hand, the execution of the processing carried out to implement the smart unlocking operation is ended.

Much like the processing according to the first embodiment, by carrying out the above processing, the smart unlocking operation can be performed properly.

Fifth Embodiment

In the case of a vehicle door control system according to the fifth embodiment, the holder of the hand-held device 1 carries out an operation on a vehicle door after the holder of the hand-held device 1 and other passengers get off the vehicle 10, causing a series of operations to be performed. The series of operations includes an operation to automatically close the vehicle doors 13 to 15 each having the automatic door opening/closing function and a smart locking operation to lock all the vehicle doors 11 to 15. Thus, the door locking switch 6e2 for detecting an operation carried out by the holder of the hand-held device 1 on the rear door 15 is not provided at a location in close proximity to the door handle 6e. Instead, it is preferable to provide the door locking switch 6e2 at such a location that the holder of the hand-held device 1 is capable of operating the door locking switch 6e2 even when the rear door 15 is in an open state.

The processing begins with step S310 to produce a result of determination as to whether or not the holder of the hand-held device 1 has carried out an operation on any of the vehicle doors 11 to 15. When the determination result produced at step S310 indicates that the holder of the hand-held device 1 has carried out an operation on any of the vehicle doors 11 to 15, the processing proceeds to step S320. It is to be noted that it is also possible to provide a configuration in which, instead of polling for such an operation carried out by the holder of the hand-held device 1 on any of the vehicle doors 11 to 15 at step S310, the event of such an operation can be used as an interrupt to start processes carried out at steps S320 to S390 described as follows.

An operated one of the door locking switches 6a2 to 6e2 is associated with a specific one of the compartment external transmitters 2a to 2e. At step S320, the specific compartment external transmitter or each of the compartment external transmitters 2a to 2e is requested to transmit a request signal. Then, the processing proceeds to step S330 to produce a result of determination as to whether or not a response signal has been transmitted by the hand-held device 1 in response to this request signal. When the result of the determination indicates that a response signal has been received from the hand-held device 1, that is, when the holder of the hand-held device 1 is outside the vehicle, the processing proceeds to step S340 to collate an ID conveyed by the response signal with an ID registered in advance in the vehicle-side unit 10a and determine whether or not the result of the collation of the IDs is an OK or an NG.

Figure 6:
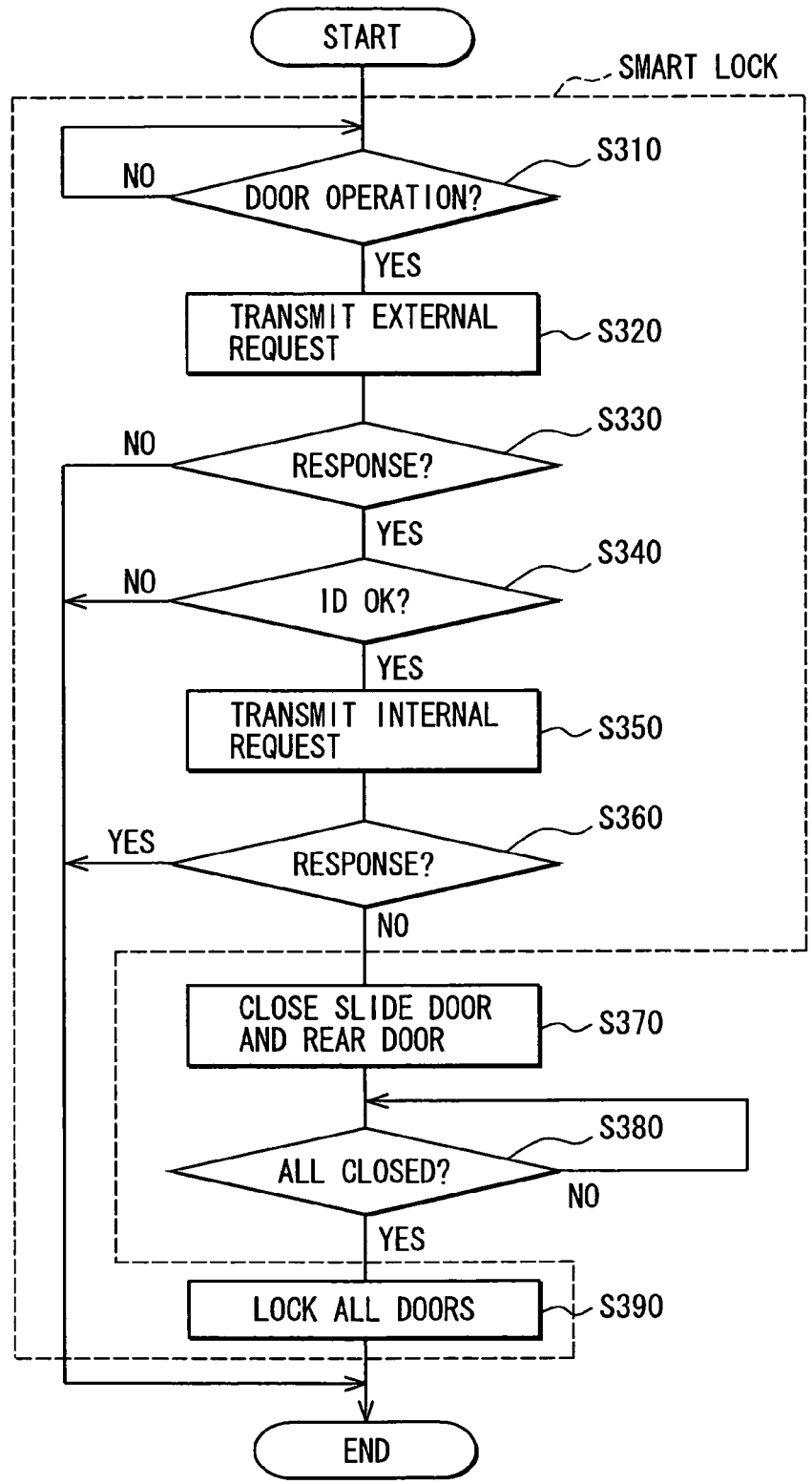
FIG. 6 is a flowchart representing processing carried out by an electronic key ECU of a vehicle-side unit to execute, among other kinds of control, door locking control to lock vehicle doors on the basis of a result of ID code collation through duplex communications between the vehicle-side unit and a hand-held device in a vehicle door control system according to a fifth embodiment.
Figure 7:
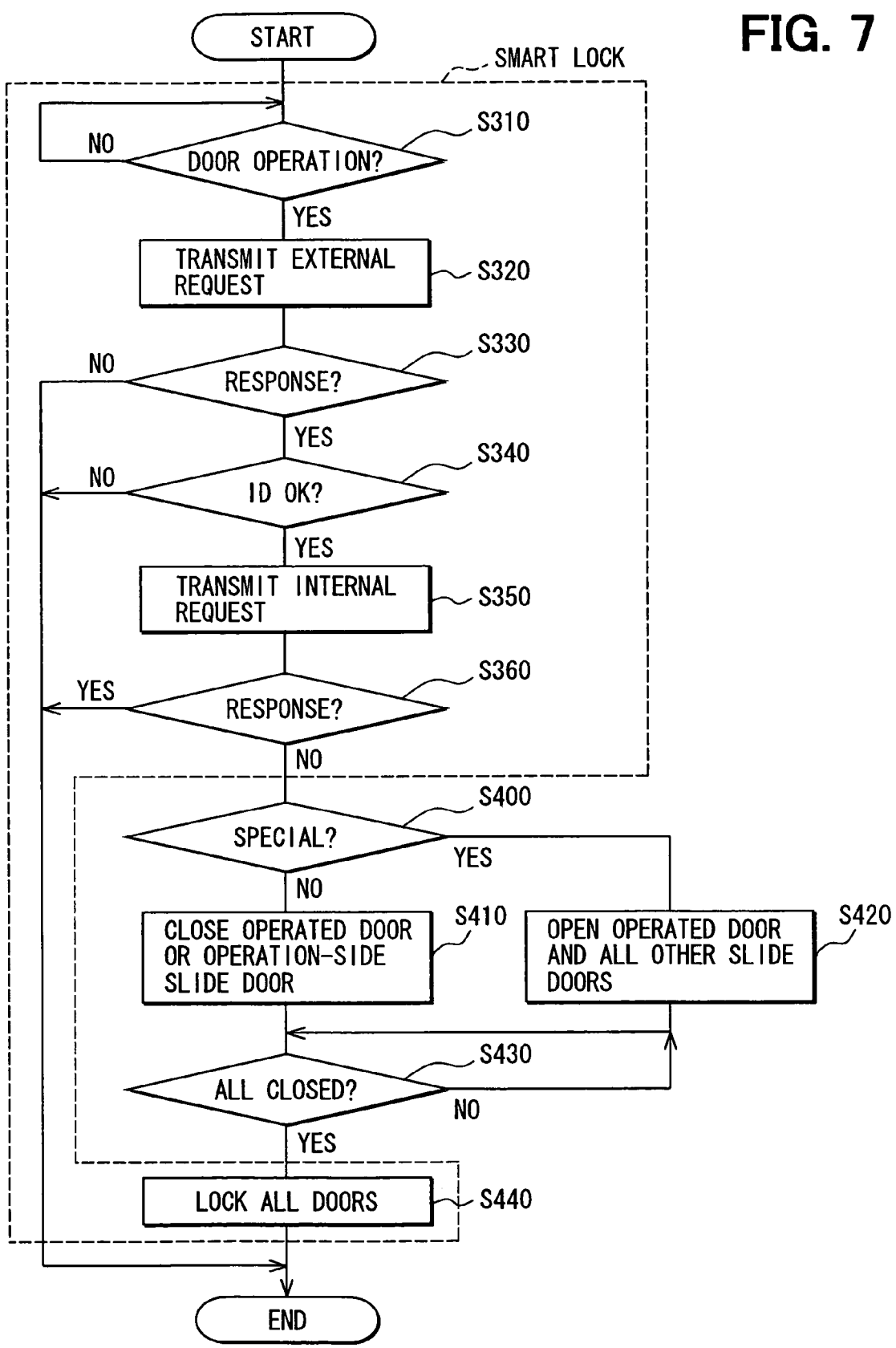
FIG. 7 is a flowchart representing processing carried out by an electronic key ECU of a vehicle-side unit to execute, among other kinds of control, door locking control to lock vehicle doors on the basis of a result of ID code collation through duplex communications between the vehicle-side unit and a hand-held device in a vehicle door control system according to a sixth embodiment.
Figure 8:
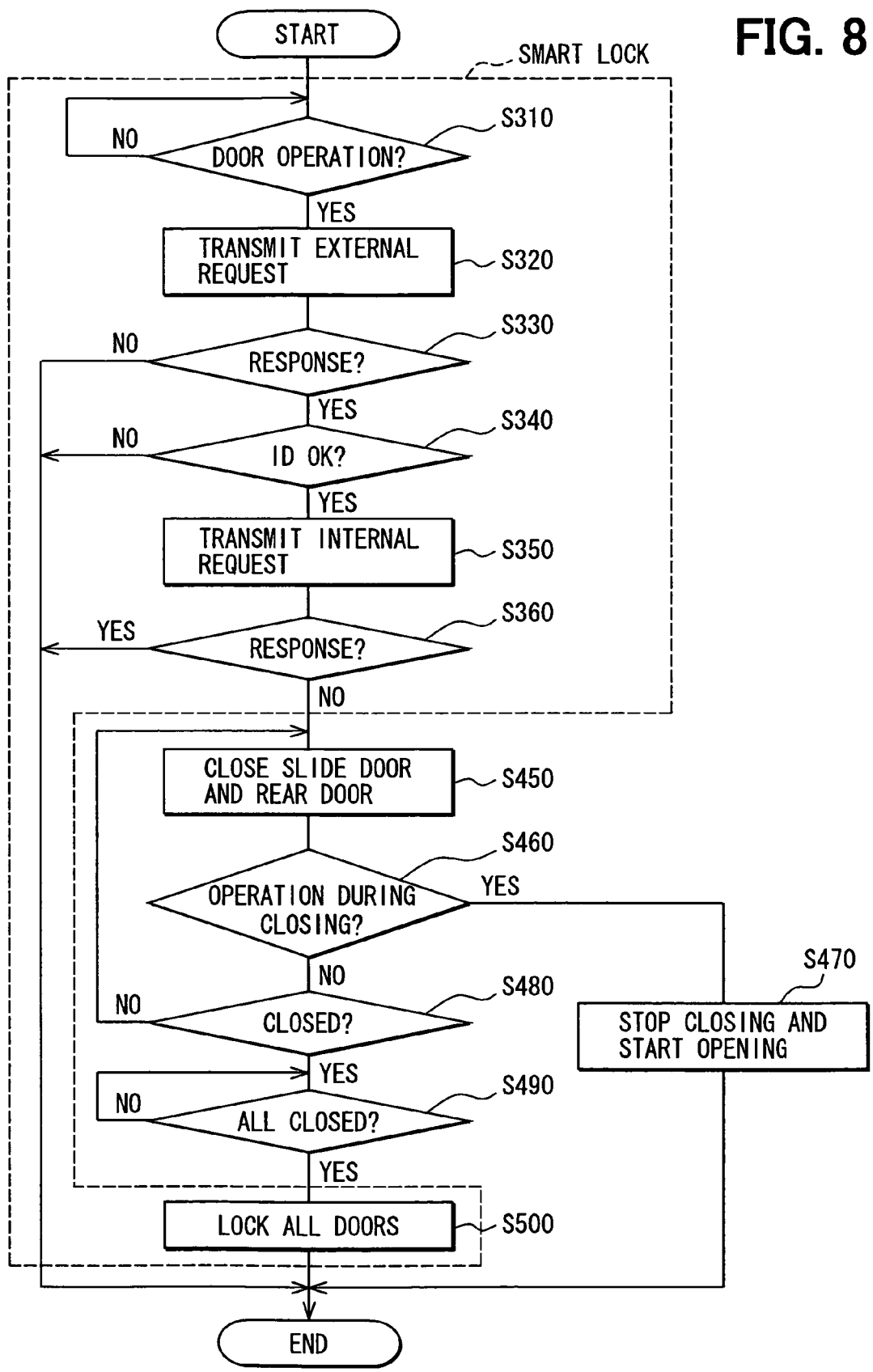
FIG. 8 is a flowchart representing processing carried out by an electronic key ECU of a vehicle-side unit to execute, among other kinds of control, door locking control to lock vehicle doors on the basis of a result of ID code collation through duplex communications between the vehicle-side unit and a hand-held device in a vehicle door control system according to a seventh embodiment.
Figure 9:
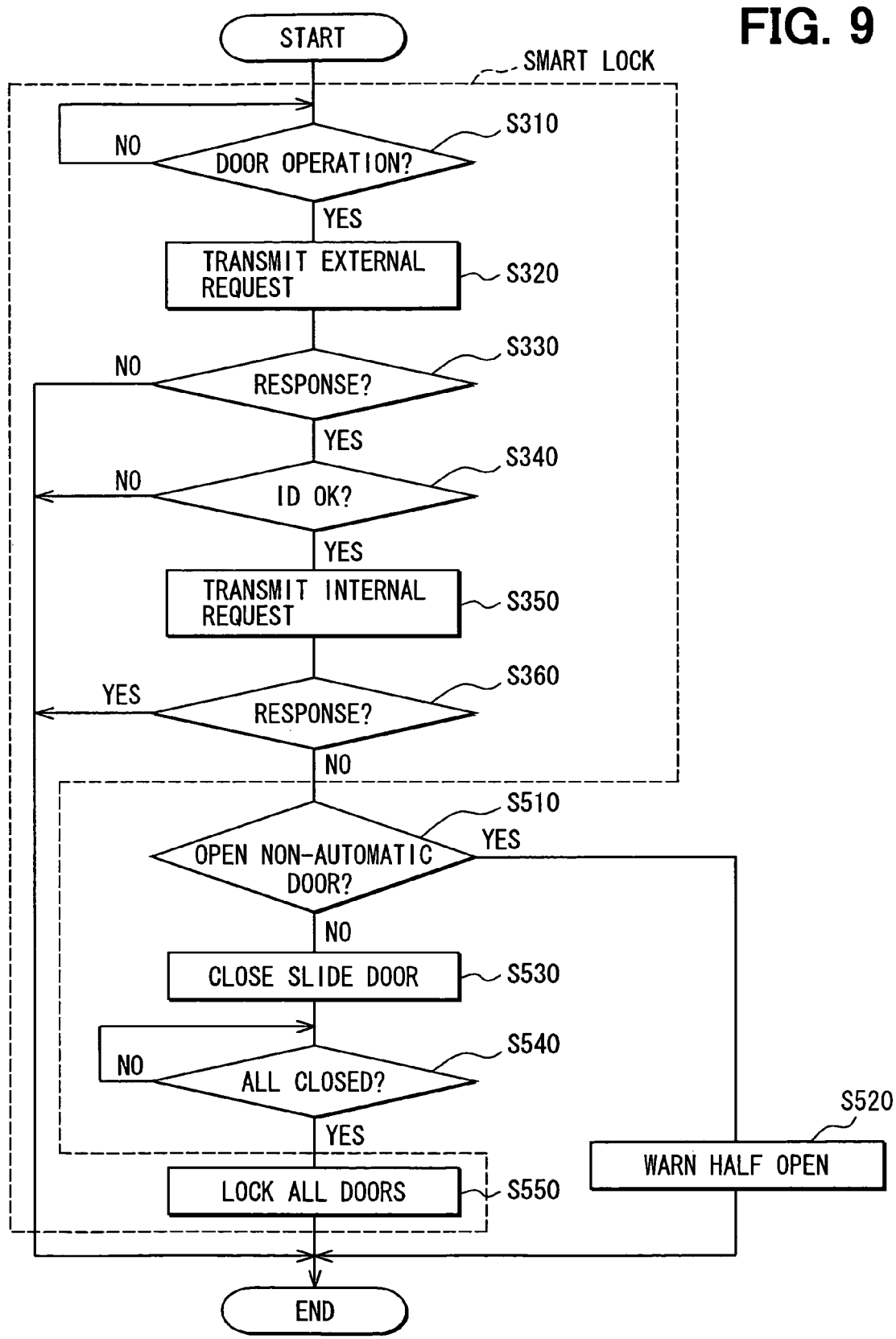
FIG. 9 is a flowchart representing processing carried out by an electronic key ECU of a vehicle-side unit to execute, among other kinds of control, door locking control to lock vehicle doors on the basis of a result of ID code collation through duplex communications between the vehicle-side unit and a hand-held device in a vehicle door control system according to an eighth embodiment.

When the result of the determination in the collation process is an OK, the processing proceeds to step S350 at which the compartment internal transmitter 2f is requested to transmit a request signal. The process is carried out at this step in order to avoid the risk of leaving the hand-held device 1 in the compartment of the vehicle 10 with all the vehicle doors 11 to 15 put in a locked state due to the fact the holder of the hand-held device 1 has forgotten to take along the hand-held device 1 with the holder when the holder of the hand-held device 1 gets off from the vehicle 10. Then, the processing proceeds to next step S360 to produce a result of determination as to whether or not a response signal has been transmitted by the hand-held device 1 in response to the request signal. When the result of the determination indicates that a response signal has been received from the hand-held device 1, the execution of the processing represented by the flowchart shown in FIG. 6 is ended without carrying processes at the subsequent step S. It is to be noted that, when the determination result produced at step S330 indicates that a response signal has not been transmitted by the hand-held device 1 in response to the request signals transmitted by the compartment external transmitters 2a to 2e or when the determination result produced at step S340 indicates that the result of the collation process is an NG, on the other hand, the execution of this processing is also ended in the same way.

When the determination result produced at step S360 indicates that a response signal was not transmitted by the hand-held device 1 in response to the request signal transmitted by the compartment internal transmitter 2f, on the other hand, the processing proceeds to step S370 at which the slide-type vehicle doors 13 and 14 as well as the rear door 15, which each have the automatic door opening/closing function, are automatically closed in case these vehicle doors are in an open state.

Then, the processing proceeds to next step S380 to produce a result of determination as to whether or not all the doors 11 to 15 of the vehicle 10 have been closed. When the result of the determination indicates that all the doors 11 to 15 of the vehicle 10 have been closed, the processing proceeds to step S390 at which the door locking control sections 5a to 5e are requested to lock all the doors 11 to 15, respectively. In this way, when the closed states of all the doors 11 to 15 of the vehicle 10 are confirmed, all the doors 11 to 15 of the vehicle 10 are locked at the same time. Thus, it is possible to prevent an operation to lock any of all the doors 11 to 15 of the vehicle 10 from being forgotten. It is to be noted that, at the same time as the operation to lock all the doors 11 to 15 of the vehicle 10 simultaneously, the electronic key ECU 4 also requests the steering lock ECU 7 to a carry out a steering locking operation and the engine ECU 8 to put the engine in a start prohibition state.

As described above, in the vehicle door control system according to this embodiment, when conditions for locking the vehicle doors 11 to 15 with the slide-type vehicle doors 13 and 14 as well as the rear door 15 put in an open state are satisfied, the vehicle-side unit 10a automatically closes the slide-type vehicle doors 13 and 14 as well as the rear door 15 each having the automatic door opening/closing function and, then, locks all the vehicle doors 11 to 15. The conditions for locking the vehicle doors 11 to 15 are satisfied when the result of the collation of the ID code is an OK and when an operation carried out by the holder of the hand-held device 1 is detected. Thus, the holder of the hand-held device 1 need not carry out operations to manually close the vehicle doors 13 to 15 and lock the vehicle doors 11 to 15 at two stages. More specifically, the holder of the hand-held device 1 need not carry out an operation to automatically close the slide-type vehicle doors 13 and 14 as well as the rear door 15 each having the automatic door opening/closing function at a first stage and, then, carry out an operation to lock all the vehicle doors 11 to 15 at a second stage.

It is to be noted that the processes carried out at steps S350 and S360 can be omitted from the processing represented by the flowchart shown in FIG. 6 as the processing carried out to implement the smart locking operation.

Sixth Embodiment

In the case of a vehicle door control system according to the sixth embodiment, when a result of determination indicates that the holder of the hand-held device 1 has carried out an operation on any specific one of the vehicle doors 11 to 15, on the basis of the condition of the detected operation carried out by the holder of the hand-held device 1, the electronic key ECU 4 makes a decision of whether or not to automatically close the other vehicle doors, which are not operated by the holder of the hand-held device 1 but each provided with the automatic door opening/closing function. Thus, when another passenger is getting off from the vehicle 10 through a specific vehicle door having an automatic door opening/closing function, for example, the specific vehicle door is not closed but left in an open state as it is. When all other passengers have gotten off from the vehicle 10 or when there are no other passengers, on the other hand, the vehicle doors each having an automatic door opening/closing function are closed. That is, the electronic key ECU 4 is capable of issuing an operation command according to the condition of the detected operation carried out by the holder of the hand-held device 1. In this way, the degree of freedom to utilize the vehicle 10 can be enhanced.

In this embodiment, therefore, at step S400 following the processing (S310 to S360) carried out to implement the smart locking operation, the electronic key ECU 4 produces a result of determination as to whether or not the operation detected at step S310 as an operation carried out by the holder of the hand-held device 1 is a special operation. The result of determination as to whether or not the operation detected at step S40 is a special operation carried out by the holder of the hand-held device 1 is produced on the basis of the duration of the operation or the number of times the operation has been carried out. When an operation is carried out continuously for at least a predetermined period of time or at least a predetermined number of times, for example, the operation is determined to be a special operation. Otherwise, the operation is determined to be an ordinary operation.

When the determination result produced at step S400 indicates that the operation detected at step S310 as an operation carried out by the holder of the hand-held device 1 is an ordinary operation, only the operated vehicle door is closed. As an alternative, a slide-type vehicle door, which has the automatic door opening/closing function and is provided on the same side as the operated door, is also automatically closed. When the determination result produced at step S400 indicates that the operation detected at step S310 as an operation carried out by the holder of the hand-held device 1 is a special operation, on the other hand, all the vehicle doors 13 to 15 each having the automatic door opening/closing function are automatically closed without regard to which of the vehicle doors 11 to 15 has been operated.

As described above, by making a decision of whether or not to automatically close the other vehicle doors, which are not operated by the holder of the hand-held device 1 but each provided with the automatic door opening/closing function, on the basis of the condition of the detected operation carried out by the holder of the hand-held device 1, the degree of freedom to utilize the vehicle 10 can be enhanced.

Seventh Embodiment

In the case of a vehicle door control system according to the seventh embodiment, when an operation carried out on any of the vehicle doors 13 to 15 each having the automatic door opening/closing function or an operation carried out on a vehicle door other than the vehicle doors 13 to 15 is detected while the vehicle doors 13 to 15 are being closed, the operation to close the vehicle doors 13 to 15 is discontinued. Instead, the processing transits to an operation to close the vehicle doors 13 to 15 each having the automatic door opening/closing function. In this way, it is possible to prevent a person or a thing from being pinched by a vehicle door being automatically closed.

In this embodiment, therefore, at step S450 following the processing (S310 to S360) carried out to implement the smart locking operation, the slide-type vehicle doors 13 and 14 as well as the rear door 15, which each have the automatic door opening/closing function, are automatically closed when the slide-type vehicle doors 13 and 14 as well as the rear door 15 are each in an open state. Then, the processing proceeds to step S460 to produce a result of determination as to whether or not an operation carried out on any of the vehicle doors 13 to 15 each having the automatic door opening/closing function or an operation carried out on a vehicle door other than the vehicle doors 13 to 15 has been detected while the vehicle doors 13 to 15 are being closed.

When the determination result produced at step S460 indicates that an operation carried out on any of the vehicle doors 13 to 15 each having the automatic door opening/closing function or an operation carried out on a vehicle door other than the vehicle doors 13 to 15 has been detected while the vehicle doors 13 to 15 are being closed, the processing proceeds to step S470 at which the operations to automatically close the slide-type vehicle doors 13 and 14 as well as the rear door 15 are discontinued. Instead, the driving sections 9c to 9e are requested to start operations to automatically open the slide-type vehicle doors 13 and 14 as well as the rear door 15. When the determination result produced at step S460 indicates that neither operation carried out on any of the vehicle doors 13 to 15 each having the automatic door opening/closing function nor an operation carried out on a vehicle door other than the vehicle doors 13 to 15 has been detected while the vehicle doors 13 to 15 are being closed, on the other hand, the processing proceeds to step S480 to produce a result of determination as to whether or not the slide-type vehicle doors 13 and 14 as well as the rear door 15 have been automatically closed completely.

When the determination result produced at step S480 indicates that the slide-type vehicle doors 13 and 14 as well as the rear door 15 have not been automatically closed completely, the processing returns to step S450 at which the operations to automatically close the slide-type vehicle doors 13 and 14 as well as the rear door 15 are continued. When the determination result produced at step S480 indicates that the slide-type vehicle doors 13 and 14 as well as the rear door 15 have been automatically closed completely, on the other hand, the processing proceeds to step S490. At step S490, the electronic key ECU 4 produces a result of determination as to whether or not all the vehicle doors 11 to 15 of the vehicle 10 have been closed. When the result of the determination indicates that the vehicle doors 11 to 15 of the vehicle 10 have been closed, the processing proceeds to step S500 at which the door locking control sections 5a to 5e are requested to lock all the vehicle doors 11 to 15, respectively.

As described above, in the vehicle door control system according to this embodiment, when an operation carried out on any of the vehicle doors is detected while vehicle doors each having the automatic door opening/closing function are being closed, the operation to close the vehicle doors each having the automatic door opening/closing function is discontinued. Instead, an operation to open the vehicle doors each having the automatic door opening/closing function is started. Thus, it is possible to prevent a person or a thing from being pinched by a vehicle door being closed in case the person or the thing is about to be pinched by the vehicle door.

It is to be noted that the vehicle door control system according to the seventh embodiment can also have a configuration in which, when an operation carried out on any specific one of the vehicle doors is detected while the specific vehicle door is being closed, only the operation to close the specific vehicle door is discontinued whereas the operations to close the other vehicle doors are continued as they are.

Eighth Embodiment

In the case of a vehicle door control system according to the eighth embodiment, the electronic key ECU 4 produces a result of determination as to whether or not the vehicle doors each not provided with the automatic door opening/closing function, that is, non-automatic doors, have been closed completely. When the non-automatic vehicle doors have not been closed completely, all the vehicle doors cannot be locked. In this case, a state of half-open doors indicating that vehicle doors have not been closed completely is reported. This is because, even though the electronic key ECU 4 is capable of issuing a command for closing any vehicle door having the automatic door opening/closing function when the vehicle door has not been closed, but it is only the holder of the hand-held device 1 or another passenger who can close a vehicle door not provided with the automatic door opening/closing function when the vehicle door has not been closed.

In this embodiment, therefore, at step S510 following the processing carried out to implement the smart locking operation (S319 to S360), the electronic key ECU 4 produces a result of determination as to whether or not any of the non-automatic vehicle doors 11 and 12 are in an open state. When the result of the determination indicates that any of the non-automatic vehicle doors 11 and 12 are in an open state, the processing proceeds to step S520 at which the electronic key ECU 4 gives a sound or an audio warning message to the holder of the hand-held device 1 or another passenger to inform the holder of the hand-held device 1 or the other passenger of a half-open door state of vehicle doors not closed completely. When the result of the determination indicates all the non-automatic vehicle doors 11 and 12 have been closed, on the other hand, the processing proceeds to step S530 to automatically close any of the slide-type vehicle doors 13 and 14 as well as the rear door 15, which each have the automatic door opening/closing function, when any of the slide-type vehicle doors 13 and 14 as well as the rear door 15 are each in an opened state.

Then, the processing proceeds to step S540 to produce a result of determination as to whether or not the operation to automatically close any of the slide-type vehicle doors 13 and 14 as well as the rear door 15 has been completed, that is, when all the doors 11 to 15 of the vehicle 10 have been closed. When the result of the determination indicates that all the doors 11 to 15 of the vehicle 10 have been closed, the processing proceeds to step S550 at which the door locking control sections 5a to 5e are requested to lock all the doors 11 to 15, respectively.

As described above, when any of the non-automatic vehicle doors have not been closed, a sound or an audio warning message is given to the holder of the hand-held device 1 or another passenger to inform the holder of the hand-held device 1 or the other passenger of half-door states of such vehicle doors each not closed completely.

It is also possible to provide a configuration in which, even when any of the non-automatic vehicle doors have not been closed for some reasons, a sound or an audio warning message is given to the holder of the hand-held device 1 or another passenger to inform the holder of the hand-held device 1 or the other passenger of half-door states of such vehicle doors each not closed completely.

It is to be noted that some or all of the above embodiments may be combined into one vehicle door control system.

What is claimed is:

1. A vehicle door control system comprising a vehicle-side unit and a hand-held device for controlling vehicle doors employed in a vehicle in accordance with a result of collation of an ID code, which is conveyed by a response signal transmitted by the hand-held device in response to a request signal transmitted by the vehicle-side unit, with an ID code registered in the vehicle-side unit, wherein the vehicle-side unit includes:
a lock-state control section for controlling a lock/unlock state of at least one vehicle door;
an automatic door opening/closing section for automatically carrying out operations to open and close the at least one vehicle door; and
an operation detection section for detecting a predetermined operation carried out by a holder of the hand-held device on any one of the vehicle doors, and wherein, when the result of the collation of the ID codes is an OK and the operation detection section detects the predetermined operation,
the lock-state control section unlocks at least the one vehicle door from a locked state; and
the automatic door opening/closing section automatically carries out an operation to open at least the one vehicle door from a closed state, wherein the one vehicle door controllable by the automatic door opening/closing section is a rear door provided at a back portion of the vehicle, wherein the vehicle-side unit has a communication area in a predetermined range surrounding the rear door as an area in which duplex communications is carried out between the hand-held device and the vehicle-side unit, and wherein, when the operation detection section detects the predetermined operation on the rear door, the vehicle-side unit opens the rear door only when the vehicle-side unit is not in communication with the hand-held device in the predetermined range around the rear door.

2. The vehicle door control system according to claim 1, wherein:

the vehicle-side unit repeats transmission of the request signal after the rear door has been unlocked by the lock-state control section and disables the automatic door opening/closing section to carry out automatic door opening while the response signal is received from the hand-held device in response to repetition of transmission of the request signal.

3. The vehicle door control system according to claim 2, wherein:

the vehicle-side unit outputs an audio message to prompt the holder of the hand-held device to stay away from the vehicle at time of repeating the transmission of the request signal.

* * * * *